United States Patent Office 3,417,021
Patented Dec. 17, 1968

3,417,021
MINERAL LUBRICATING OIL CONTAINING A POLYESTER POUR DEPRESSANT
John E. Engelhart, Westfield, N.J., assignor to Esso Research and Engineering Company, a corporation of Delaware
No Drawing. Filed Dec. 30, 1966, Ser. No. 606,054
9 Claims. (Cl. 252—56)

ABSTRACT OF THE DISCLOSURE

This disclosure is concerned with lubricating oils containing polymers comprised of esters prepared from ethylenically unsaturated carboxylic acids and linear $C_{16}$–$C_{18}$ oxo alcohols. It has been found that polyesters prepared from linear $C_{16}$–$C_{18}$ oxo alcohols have improved pour point depressing properties when added to wax-containing lubricating oils.

BACKGROUND OF THE INVENTION

The present invention relates to improved lubricating oils and to polymers useful as additives for such oils. More particularly, the invention refers to lubricating oils having low pour points and to certain polymeric ester materials useful as pour depressant additives for such oils.

Mineral lubricating oils containing paraffin wax therein have the characteristics of becoming less fluid as the temperature decreases. This loss of fluidity is due to the crystallization of the combined wax into needle-like crystals which eventually form a spongy mass in trapping the lubricating oil therein. The lowest temperature at which a waxy mineral lubricating oil retains its flow characteristics is known in the art as the "pour point."

It has long been known that various compositions act as wax crystalline modifiers when blended with waxy mineral lubricating oils. These compositions modify the size and shape of wax crystals in such a manner as to permit the oil to remain fluid at a lower temperature. They are known to the lubricating art as "pour point depressors" or "pour depressants" in that they lower the limiting temperature at which the oil maintains its free flow characteristics.

Various pour point depressors have been described in the literature. It is already known that certain unsaturated esters, for example, acrylate and methacrylate esters of higher aliphatic alcohols, can be polymerized to make high molecular weight products which are soluble in lubricating oils and are capable of reducing the pour point thereof.

By way of illustration of prior art practices, U.S. 2,694,685 describes the preparation and utilization of copolymers useful as pour depressants and V.I. improvers for waxy mineral lubricating oils. These copolymers are formed from vinyl acetate and the dialkyl maleic acid ester of saturated alcohols having an average of 12 to 18 carbon atoms. It is therein taught that the primary straight chain alcohols are preferably used for esterifying the carboxyl groups. Alcohols found useful, although not as effective, include the secondary alcohols, branched chain alcohols and cyclic alcohols. Specific alcohols shown to be useful by actual test include the saturated straight chain alcohols found in coconut oil and "Lorol B."

U.S. 2,677,662 refers to copolymers of maleic acid and its derivatives with vinyl alkyl ethers, which copolymers have been esterified with a high molecular weight aliphatic alcohol. Reference is also made therein to the fact that it is generally well-known that oil-soluble linear polymers having long straight side chains are pour depressants if the side chains range from 10 to 20 carbon atoms. The reference indicates that a very suitable mixed alcohol is a product obtained by hydrogenation of coconut oil. Such a product is sold under the trade name "Lorol" and is a mixture of saturated straight chain alcohols containing from 10 to 18 carbon atoms and having a major proportion of n-dodecyl alcohol. The reference also makes an unsupported general statement that branched chain alcohols may also be used but does not indicate any preference for such alcohols.

U.S. 2,618,602 describes the pour point depressing characteristics of lubricating oil additives obtained by the polymerization of certain specific alkyl fumarate esters. It is therein disclosed that normal $C_{12}$ saturated alcohol, called lauryl alcohol or dodecanol, and to a lesser degree the tetradecyl alcohol and mixtures of these seem to be the only ones of the saturated aliphatic alcohols of the $C_1$–$C_{18}$ series which, when esterified with fumaric acid and its homologues, make a product having excellent pour depressing properties when added to waxy mineral lubricating oils in small amounts. By itself, the n-tetradecyl ($C_{14}$) alcohol produces a fumarate ester which may be polymerized to a product having only fair pour depressing properties but similar esters of alcohols having 16 or more, or having 10 or less, carbon atoms appear to have no pour depressing properties whatsoever.

Similarly, many other references can be found, e.g., U.S. 2,637,697; U.S. 2,612,475; etc., which disclose the use of polymeric esters prepared from $C_{10}$–$C_{20}$ alcohols for depressing or lowering the pour point of various waxy lubricating oils. In essence, the prior art references teach that the pour point of lubricating oils may be lowered by the use of polyesters formed from $C_{10}$–$C_{20}$ normal alcohols and to a lesser degree, $C_{10}$–$C_{20}$ branched aliphatic alcohols.

THE INVENTION

The present invention is based on the very surprising discovery that polymers derived from an ester of an ethylenically unsaturated carboxylic acid and linear $C_{16}$–$C_{18}$ oxo alcohols, i.e., those alcohols having the formula:

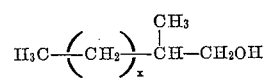

wherein $x$ is a whole number within the range from 12 to 14, have unexpected superior pour point depressing properties when added to waxy mineral lubricating oils in small amounts. The crux of the invention does not reside in the use of any particular unsaturated carboxylic acid but rather, in the use of the very specific linear oxo alcohols defined above. Such linear oxo alcohols may be conveniently prepared, for example, by the well-known oxo process when utilizing the appropriate alpha-olefin feed. As will be brought out more fully hereinlater, the use of the above alcohols unexpectedly impart an improvement in pour depressing activity which is greater than that imparted by any other alcohol.

Broadly, the present invention suitably employs polymers prepared from the linear $C_{16}$–$C_{18}$ oxo esters of unsaturated acids such as the acrylic acids, the methacrylic acids, and the like, i.e., acids having the formula:

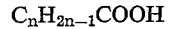

the fumaric acids, maleic acids and the like, i.e., acids having the formula:

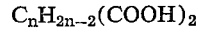

wherein $n$ is a whole number within the range between about 2 and 10, preferably within the range between 2 and 6.

The present invention, therefore, is directed to polymers containing the following repeating structural units:

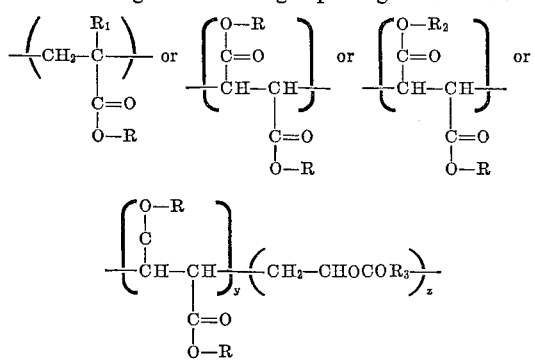

or mixtures thereof wherein R is the linear $C_{16}$–$C_{18}$ oxo alcohol residue; $R_1$ is a hydrogen atom or a lower alkyl group, e.g., methyl, ethyl, propyl, etc.; $R_2$ is a $C_1$–$C_{30}$ hydrocarbon radical such as an alkyl group or an aryl group; $R_3$ is a $C_1$–$C_5$ alkyl group, and $y$ and $z$ are whole numbers, the value of which depend on the mole percent of monomers employed in the polymerization reaction, and also on the average molecular weight of the polymer.

The present invention preferably includes the polyacrylates which contain two or more recurring units;

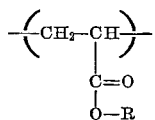

the polymethacrylates which contain two or more recurring units:

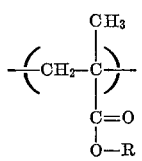

and the fumarate or maleate vinyl acetate copolymers which contain one or more units such as:

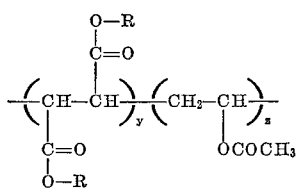

wherein R, $z$ and $y$ are as defined above.

The linear $C_{16}$–$C_{18}$ oxo esters of unsaturated monobasic acids, i.e., the acrylic acids, which are employed as monomeric components in producing the additive agents employed in accordance with the invention are esters of $C_3$ to about $C_6$, especially the $C_3$–$C_4$, unsaturated monobasic acids. Examples of acids which may be esterified to produce such esters include acrylic acid, the butenic acids, such as crotonic, isocrotonic, vinylacetic and methacrylic acids, the pentenic acids such as, teglic, angelic, and senecioic acid, the hexenic acids, etc. Esters of acrylic acid, methacrylic acid and the butenic acids are preferred for the purposes of this invention.

The linear $C_{16}$–$C_{18}$ oxo esters of unsaturated dibasic acids which are employed as monomeric components in producing the additive agents employed in accordance with the invention are esters of $C_4$–$C_5$ unsaturated dibasic acids. Examples of acids which may be esterified to produce such esters include maleic acid, fumaric acid, citraconic acid, mesaconic acid, glutaconic acid, itaconic acid and the like. Esters of the butenedioic acids, fumaric acid and maleic acid and mixtures of the two, are preferred for the purposes of this invention.

The esters which are polymerized or copolymerized according to the present invention are prepared from the aforedescribed unsaturated carboxylic acids and the linear $C_{16}$–$C_{18}$ oxo alcohols defined above. Esterification with the specific alcohols of this invention has been found to unexpectedly render such ester monomers uniquely active when polymerized. Examples of effective esters include, among others, linear $C_{16}$ oxo acrylate, linear $C_{18}$ oxoacrylate, linear $C_{16}$ oxo chloroacrylate, linear $C_{16}$ oxo methacrylate, linear $C_{17}$ oxo methacrylate, linear $C_{16}$ oxo crotonate, linear $C_{16}$ oxo isocrotonate, linear $C_{18}$ oxo isocrotonate, linear $C_{16}$ oxo teglate, di-linear $C_{16}$ oxo maleate, di-linear $C_{18}$ oxo maleate, di-linear $C_{16}$ oxo chloromaleate, linear $C_{16}$ oxo octadecyl maleate, di-linear $C_{16}$ oxo fumarate, di-linear $C_{18}$ oxo fumarate, linear $C_{16}$ oxo dodecyl fumarate, di-linear $C_{16}$ oxo citraconate, linear $C_{17}$ oxo-linear $C_{18}$ oxo citraconate, linear $C_{16}$ oxo octadecyl citraconate, di-linear $C_{16}$ oxo mesaconate, di-linear $C_{16}$ oxo itaconate, di-linear $C_{18}$ oxo itaconate, di-linear $C_{16}$ oxo glutaconate, linear $C_{16}$ oxo dodecyl glutaconate, linear $C_{18}$ oxo dodecyl glutaconate and the like.

The linear $C_{16}$–$C_{18}$ oxo ester polymers suitably employed in the present invention may contain an amount of another monomer which is not an ester prepared from the linear $C_{16}$–$C_{18}$ oxo alcohols, e.g., $C_1$–$C_{20}$ aliphatic esters of the aforedescribed unsaturated carboxylic acids, and vinyl esters of low molecular weight acids containing from about 2 to about 6 carbon atoms per molecule. Specific examples of such vinyl esters include vinyl acetate, vinyl propionate, vinyl butyrate, vinyl pivalate, vinyl pentanoate, vinyl hexanoate, and the like. In general, it is found that from 0 to about 60 mole percent, e.g., 30 mole percent, of the aforedescribed linear $C_{16}$–$C_{18}$ oxo ester monomers may be replaced by another monomer. For example, a very desirable copolymer of this invention comprises from about 50 to about 80 mole percent di-linear $C_{16}$ oxo fumarate and from about 20 to about 50 mole percent vinyl acetate. An especially preferred copolymer comprises 70–80 mole percent di-linear $C_{16}$ oxo fumarate and 30–20 mole percent vinyl acetate.

In carrying out the invention, the linear $C_{16}$–$C_{18}$ oxo ester is first prepared either by direct esterification of the linear $C_{16}$–$C_{18}$ oxo alcohols with the aforedescribed unsaturated acids, or by ester interchange, i.e., by reacting the linear $C_{16}$–$C_{18}$ oxo alcohols with a lower alkyl ester such as methyl fumarate or diethyl fumarate, these esterification reactions being well known in the art. For example, the linear $C_{16}$–$C_{18}$ oxo alcohols are generally reacted with the unsaturated carboxylic acid in the presence of a suitable solvent (e.g., benzene, toluene, heptane and the like), and a catalyst such as sulfuric acid, phosphoric acid, hydrochloric acid, benzene sulfonic acid, p-toluene sulfonic acid and the like. The reaction may then be carried out at the reflux temperature of the reaction mixture and the water of the esterification may be removed as an azeotrope of the solvent. At the end of the reaction, the product is water washed until neutral and the solvent is removed by vacuum distillation. Esterification may result in partial or complete modification of the carboxyl groups. It is preferred, however, that the esterification be essentially complete.

The methods of polymerizing the linear $C_{16}$–$C_{18}$ oxo esters to form polymers thereof is immaterial in the formation of the polymeric compound described herein and any of the numerous processes available can be used therefor. For example, the monomeric materials and catalysts, where used, are generally charged into a reactor with or without a diluent and are heated to a temperature at which the catalyst utilized has an appreciable rate of decomposition for a period of a few minutes to several hours or more. The catalyst selected and the temperature employed in the polymerization will be varied so as to produce products having the desired molecular weights. Thus, if one desires very low molecular weight products, one should select a higher reaction temperature, such as of the order of 100° to 150° C., and select a catalyst that has a satisfactory decomposition rate within the range of temperature. If the higher molecular weight products are desired, one may select the lower range of temperature such as 60° to 85° C., and select a catalyst having a decomposition rate within that range. In general, it is preferred to employ temperature within the range of about 60° to about 85° C. and catalysts that will be effective within that range. In general, any of the conventional free radical catalysts, e.g., those of the peroxide or azo-type, may be used. By way of example, suitable peroxide-type catalysts include benzoyl peroxide, ditertiary butyl peroxide, tertiary butyl hydroperoxide, diacetyl peroxide, diethyl peroxycarbonate, 2-phenyl propanehydroperoxide (known also as cumene hydroperoxide). The azo-type polymerization catalysts are also well known to those skilled in the art. By way of example of suitable azo-type catalyst can be mentioned α,α-azodiisobutyronitrile, secondary and tertiary aliphatic azo compounds, and the like. The polymeriaztion catalyst is used in small amounts, which are generally not in excess of 3% by weight based upon the monomeric material. A suitable quantity is often in the range of 0.005 to 0.5% by weight.

As mentioned hereinbefore, the polymerization may be carried out in the presence of a diluent. The polymerization solvent useful herein may be any suitable inert aromatic, paraffinic and cycloparaffinic hydrocarbon such as benzene, toluene, xylene, hexane, n-heptane, cyclohexane, methylcyclohexane, ethylbenzene, isooctane, and the like. Mixtures of these various materials can also be employed.

The effect of the molecular weight of the linear $C_{16}$–$C_{18}$ oxo ester polymer of this invention is relatively unimportant from the point of view of pour point. For this reason, the molecular weight of the polymer can vary considerably. In general, the polymeric pour depressant of this invention may have a number average molecular weight in the range of from about 2,000 to about 100,000 or more, i.e., the upper range is limited only by the polymer oil solubility. It is preferred, however, to employ polymers having molecular weights within the range between about 10,000 and 35,000.

The oil base stock to be used may be any mineral lubricating oil having the desired lubricating properties. Thus, it may be a hydrocarbon oil obtained from a paraffinic, naphthenic, asphaltic or mixed base crude, and/or mixtures thereof. The viscosity of these oils may vary over a wide range such as from 70 SUS at 100° F. to 300 SUS at 210° F. The boiling point of these oils may also vary over a wide range, e.g., 300°–750° F.

The polymeric additives of this invention may be blended directly with the aforedescribed wax-containing petroleum oils. Concentrations within the range of from about 0.005 to about 5 wt. percent (based on the weight of the wax-containing oil) will be operable and will give the desired improvement in flow. Based on economic reasons, from about 0.02 to about 1 wt. percent of the additive is preferably employed.

The polyesters of this invention are found compatible with other additive materials and may be blended successfully with petroleum oils containing minor amounts of viscosity index improvers, rust inhibitors, lubricity agents, oxidation inhibitors and the like.

The superior additives of the present invention may be understood more fully from the following examples illustrating same.

Example 1

Preparation of linear $C_{16}$ oxo methacrylate.—In this example, 121 grams of the linear $C_{16}$ oxo alcohol, 43 grams of methacrylic acid, 150 ml. n-heptane, 2.5 grams p-toluenesulfonic acid and 1.5 grams hydroquinone were heated to reflux and the water evolved was collected in a Dean-Stark trap. At the end of a 3.5 hour period, 8.5 ml. of water were collected and the reaction completed. The ester product was purified and recovered by washing with 20 wt. percent sodium carbonate-2 wt. percent sodium hydroxide aqueous solution and water until neutral, removing the aqueous layer, drying over sodium sulfate, filtering off said sodium sulfate, and by stripping off the solvent by blowing with nitrogen at 90° C.

Example 2

Preparation of linear $C_{16}$ oxo polymethacrylate.—A polymer of linear $C_{16}$ oxo methacrylate was prepared as follows: 100 grams of the ester product from Example 1 and 100 ml. n-heptane were charged to a 1 liter stirred polymer kettle, and to this was added 0.2 gram of azobisisobutyronitrile (VAZO). The polymerization was continued for a period of about 8 hours at a temperature of about 75° C. The polymer product was dissolved in hexane solvent and dialyzed at reflux temperature for 8 hours through a thin rubber membrane against pure hexane solvent. The resulting product, after stripping off the hexane, was a hard, brittle, colorless polymer having a number average weight of about 26,000. As employed herein, the term dialysis relates to the preferential diffusion of one or more lower molecular weight components (e.g, unreacted monomers) of a solution of polymers in a specific solvent through a semi-permeable membrane in the direction of a liquid-phase consisting predominantly of solvent.

Example 3

Preparation of linear $C_{16}$ oxo fumarate.—In another run, 121 grams of the linear $C_{16}$ oxo alcohol of this invention, 29 grams fumaric acid, 400 ml. toluene and 4.0 grams p-toluenesulfonic acid were heated at reflux for a period of about 4 hours. The esterification was carried out to essentially theoretical completion at 116° C. by removing the water of reaction as an azeotrope with the toluene. The resulting reaction mixture was then washed with 20 wt. percent sodium carbonate solution and then water until neutral. The toluene solution was then dried over magnesium sulfate, filtered and the solvent removed under reduced pressure.

Example 4

Preparation of linear $C_{18}$ oxo fumarate.—The process of Example 3 was repeated except that the linear $C_{16}$ oxo alcohol was replaced with an equivalent molar amount of the linear $C_{18}$ oxo alcohol.

Example 5

Preparation of linear $C_{16}$ oxo fumarate-vinyl acetate copolymer.—A $C_{16}$ oxo fumarate-vinyl acetate copolmyer was prepared by reacting 123 grams (0.22 mole) of the linear $C_{16}$ oxo fumarate of Example 3 with 45 grams (0.52 mole) of vinyl acetate and 1.5 grams of t-butyl perbenzoate catalyst at a temperature of about 86° C. for a period of about 7 hours. Upon completion of the reaction, the unreacted materials were removed by dialysis through a thin rubber membrane in refluxing hexane for a period of about 8 hours. The polymer residue (90% of the product) was a light colored, brittle polymer having a number average molecular weight of about 50,000.

Example 6

Preparation of linear $C_{18}$ oxo fumarate-vinyl acetate copolymer.—The process of Example 5 was repeated except that the linear $C_{16}$ oxo fumarate was replaced with an equivalent molar amount of the linear $C_{18}$ oxo fumarate prepared in Example 4.

Example 7

The linear $C_{16}$ oxo polymethacrylate prepared in Example 2 was added to Solvent 140 neutral, a non-waxy Mid-Continent crude (140 SUS vis. @ 100° F.) lubricant base stock in order to illustrate the unique pour depressant activity imparted by linear $C_{16}$ oxo side chains. Various concentrations of the polymer were added to the oil and the resulting ASTM pour points of the blends were compared with that of the same base stock containing equivalent amounts of other polymethacrylates which were prepared from normal and branched chain primary alcohols under the same process conditions recited in Examples 1 and 2, i.e., the process of Example 1 and Example 2 was repeated except that the linear $C_{16}$ oxo alcohol was replaced by an equivalent amount of n-dodecyl (n-$C_{12}$) alcohol, branched $C_{13}$ oxo alcohol, n-tetradecyl (n-$C_{14}$) alcohol, linear $C_{14}$ oxo alcohol, n-hexadecyl (n-$C_{16}$) alcohol, n-octadecyl (n-$C_{18}$) alcohol or n-eicosyl (n-$C_{20}$) alcohol. The comparative data is presented in Table I.

TABLE I.—EVALUATION OF LINEAR $C_{16}$ OXO POLYMETHACRYLATE IN SOLVENT 140 NEUTRAL*

| Additive | ASTM pour point at various concentrations, °F. | | | |
|---|---|---|---|---|
| | 0.05 wt. percent | 0.10 wt. percent | 0.20 wt. percent | 0.30 wt. percent |
| n-$C_{12}$ polymethacrylate | 0 | 0 | 0 | 0 |
| Branched $C_{13}$ oxo polymethacrylate | 0 | 0 | +5 | 0 |
| n-$C_{14}$ polymethacrylate | 0 | 0 | −5 | −10 |
| Linear $C_{14}$ oxo polymethacrylate | +10 | +10 | +10 | +10 |
| n-$C_{16}$ polymethacrylate | +5 | +5 | 0 | 0 |
| Linear $C_{16}$ oxo polymethacrylate | −30 | <−35 | | |
| n-$C_{18}$ polymethacrylate | 0 | 0 | 0 | 0 |
| n-$C_{20}$ polymethacrylate | 0 | 0 | −5 | +5 |

*Lubricating base stock having a pour point of +5° F., a viscosity of 140 SUS at 100° F. and being derived from a Mid-Continent non-waxy crude.

Example 8

This example further illustrates the unique pour depressant activity exhibited by polymers of unsaturated esters prepared from the linear $C_{16}$ oxo alcohol of this invention.

In another test, the polymethacrylates of Example 5 were each blended in another typical lubricating base stock, i.e., a Solvent 150 Neutral and evaluated for pour point depressant activity. The results given in Table II show that the linear $C_{16}$ oxo alcohol unexpectedly (e.g., compare the polyesters prepared from n-$C_{14}$ alcohol and the linear $C_{14}$ oxo alcohol) imparts a marked improvement in pour point depressancy.

TABLE II.—EVALUATION OF LINEAR $C_{16}$ OXO POLYMETHACRYLATE IN SOLVENT 150 NEUTRAL*

| Additive | ASTM Pour Point At Various Concentrations, °F. | | | |
|---|---|---|---|---|
| | 0.05 wt. percent | 0.10 wt. percent | 0.20 wt. percent | 0.30 wt. percent |
| n-$C_{12}$ polymethacrylate | +5 | 0 | +5 | +5 |
| Branched $C_{13}$ oxo polymethacrylate | +5 | +5 | +5 | +5 |
| n-$C_{14}$ polymethacrylate | 0 | −5 | −5 | −5 |
| Linear $C_{14}$ oxo polymethacrylate | +10 | +5 | +10 | +10 |
| n-$C_{16}$ polymethacrylate | +5 | +5 | +10 | +5 |
| Linear $C_{16}$ oxo polymethacrylate | −15 | −20 | −25 | −30 |
| n-$C_{18}$ polymethacrylate | 0 | 0 | −5 | 0 |
| n-$C_{20}$ polymethacrylate | −5 | 0 | 0 | +5 |

*Lubricating base stock having an ASTM pour point of +5° F., a viscosity of 150 SUS at 100° F. and being derived from a Mid-Continent non-waxy crude.

Example 9

This example serves to illustrate the superior flow characteristics of lubricating compositions containing copolymers of unsaturated esters prepared from the linear $C_{16}$ oxo and linear $C_{18}$ oxo alcohols of this invention.

The linear $C_{16}$ oxo and the linear $C_{18}$ oxo fumarate-vinyl acetate copolymers, (linear $C_{16}$ oxo Fum-VA and linear $C_{18}$ oxo Fum-VA) prepared in Examples 5 and 6 were added to a number of petroleum oils representing essentially all of the different types of domestic lubricant base stocks ranging from light neutrals to bright stocks. The linear $C_{16}$ oxo fumarate/vinyl acetate copolymer-oil blends and the linear $C_{18}$ oxo fumarate/vinyl acetate copolymer-oil blends were evaluated in the standard ASTM pour point test and the resulting pour points were compared with that of the same base stocks containing equivalent amounts of other fumarate-vinyl acetate copolymers which were prepared from normal alcohols and other linear oxo alcohols under the same process conditions recited in Examples 3 and 5, i.e., the processes of Examples 3 and 5 were repeated except that the linear $C_{16}$ oxo alcohol was replaced by an equivalent molar amount of linear $C_{12}$ oxo alcohol, n-$C_{14}$ alcohol, linear $C_{14}$ oxo alcohol, a 50/50 mixture (mole basis) of a n-$C_{14}$/n-$C_{16}$ alcohol, n-$C_{16}$ alcohol or n-$C_{18}$ alcohol. The comparative results are shown in Table III.

TABLE III.—EVALUATION OF LINEAR $C_{16}$ AND LINEAR $C_{18}$ OXO FUMARATE-VINYL ACETATE COPOLYMERS

| Base stock | 0.05 Wt. % Additive | | | | | | | |
|---|---|---|---|---|---|---|---|---|
| | Linear $C_{12}$ oxo Fum-VA | n-$C_{14}$ Fum-VA | Linear $C_{14}$ oxo Fum-VA | n-$C_{16}$ Fum-VA | Linear $C_{16}$ oxo Fum-VA | n-$C_{14}$ n-$C_{16}$ Fum-VA | n-$C_{18}$ Fum-VA | Linear $C_{18}$ oxo Fum-VA |
| S325N [1] | +15 | 0 | +15 | +20 | −15 | +5 | +15 | −5 |
| RL90N [2] | −5 | −5 | 0 | −10 | −15 | −5 | −5 | −5 |
| RL300N [3] | +10 | −5 | +5 | +10 | −15 | +5 | +5 | +5 |
| 100N [4] | +10 | −15 | −10 | −5 | −15 | 0 | 0 | −25 |
| S150N [5] | +15 | 0 | +10 | ±10 | −15 | +10 | +10 | −15 |

[1] ASTM pour point of +10° F.; 325 SUS vis. at 100°; derived from waxy Mid-Continent crude.
[2] ASTM pour point of +10°; 90 SUS vis. at 100°; derived from West Coast crude.
[3] ASTM pour point of +10°; 300 SUS vis. at 100°; derived from West Coast crude.
[4] ASTM pour point of +5°; 110 SUS vis. at 100°; derived from Mid-Continent non-waxy crude.
[5] ASTM pour point of 0°; 150 SUS vis. at 100°; derived from Mid-Continent waxy crude.

As will be apparent from an examination of the comparative data reported above, the linear $C_{16}$ oxo alcohol and the linear $C_{18}$ oxo alcohol of this invention imparted a marked improvement over that which could be obtained by the use of another alcohol. Such improvement is unexpected for it is generally believed that straight chain alcohols are preferred to branched chain alcohols and, indeed, this is the case (e.g., compare the n-$C_{14}$ Fum-VA and the linear $C_{14}$ oxo Fum-VA) with the exception of the linear $C_{16}$–$C_{18}$ oxo alcohols. In other words, inasmuch as the polymer backbone and ester side chain linkage are analogous, the improvement in pour point depressancy afforded by the instant invention is attributable to the configuration of the linear $C_{16}$ oxo and the linear $C_{18}$ oxo side chains.

In summary, polyesters prepared from the alcohols of this invention unexpectedly depress the pour point of lubricating oils to a greater extent than polyesters prepared from any other alcohol, e.g., the normal alcohols and the prior art oxo alcohols. With respect to the later, it should be noted that the linear oxo alcohols of this invention differ from the oxo alcohols previously used to prepare polyester pour depressants. Thus, the linear oxo alcohols of this invention consist essentially of pure primary alcohols having only one branched chain, i.e., a methyl group adjacent the terminal carbon atom whereas the prior art oxo alcohols may be described as comprising random branched, non-primary alcohol mixtures, e.g., U.S. 3,239,570 and U.S. 3,239,571 which are incorporated herein in their entirety by express reference.

It is not intended that this invention be limited to the specific examples presented by way of illustration. The scope of the invention is limited only by the appended claims.

What is claimed is:

1. A lubricant composition having improved flow and pour point characteristics, which comprises a major amount of a wax-containing mineral oil having incorporated and blended therewith a pour depressing effective amount of an oil-soluble polymer of 2000 to 100,000 molecular weight and containing at least 40 mol percent of an ester prepared from (a) an alcohol having the formula:

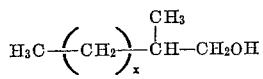

wherein $x$ represents a whole number within the range from 12 to 14 and (b) an ethylenically unsaturated carboxylic acid having the formula:

$$C_nH_{2n-1}COOH \text{ or } C_nH_{2n-2}(COOH)_2$$

or mixtures thereof wherein $n$ represents a whole number within the range from about 2 to about 10.

2. A composition according to claim 1 wherein $n$ represents a whole number within the range between 2 and 6.

3. A composition according to claim 2 wherein said unsaturated carboxylic acid is acrylic acid.

4. A composition according to claim 3 wherein said unsaturated acid is methacrylic acid.

5. A lubricant composition having improved flow and pour point characteristics, which comprises a major amount of a wax-containing mineral oil having incorporated and blended therewith a pour depressing effective amount of an oil-soluble copolymer of 10,000 to 35,000 molecular weight of (1) an ester prepared from (a) an alcohol having the formula:

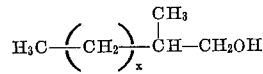

wherein $x$ represents a whole number within the range from 12 to 14 and (b) an ethylenically unsaturated carboxylic acid having the formula:

$$C_nH_{2n-1}COOH \text{ or } C_nH_{2n-2}(COOH)_2$$

or mixtures thereof wherein $n$ represents a whole number within the range from about 2 to about 10; and (2) a vinyl ester having the formula:

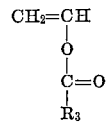

wherein $R_3$ represents a $C_1$–$C_5$ alkyl group; said copolymer being characterized by containing at least 40 mole percent of the ester prepared from (a) and (b).

6. A composition according to claim 5 wherein $n$ represents a whole number within the range from 2 to 6.

7. A composition according to claim 6 wherein said carboxylic acid is fumaric acid.

8. A composition according to claim 7 wherein said vinyl ester is vinyl acetate.

9. A composition according to claim 8 wherein said copolymer contains from about 50 to about 80 mole percent of a linear $C_{16}$–$C_{18}$ oxo fumarate and from about 20 to about 50 mole percent vinyl acetate.

References Cited

UNITED STATES PATENTS

| | | |
|---|---|---|
| 2,600,450 | 6/1952 | Van Horne et al. ____ 252—56 X |
| 2,677,662 | 5/1954 | Mikeska et al. _____ 252—56 X |
| 2,876,213 | 3/1959 | Bartlett et al. _____ 252—56 X |
| 3,136,743 | 6/1964 | Conway et al. _____ 252—56 X |

DANIEL E. WYMAN, *Primary Examiner.*

W. H. CANNON, *Assistant Examiner.*

U.S. Cl. X.R.

260—78.5